(12) United States Patent
Dijk et al.

(10) Patent No.: US 7,006,701 B2
(45) Date of Patent: Feb. 28, 2006

(54) SEQUENTIAL DIGITAL IMAGE COMPRESSION

(75) Inventors: Victor Emmanuel Stephanus van Dijk, Eindhoven (NL); Francesco Pessolano, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 681 days.

(21) Appl. No.: 10/267,705

(22) Filed: Oct. 9, 2002

(65) Prior Publication Data

US 2004/0071353 A1    Apr. 15, 2004

(51) Int. Cl.
G06K 9/36    (2006.01)
(52) U.S. Cl. .................. 382/243; 382/209; 382/219
(58) Field of Classification Search ................ 382/236, 382/243, 167, 209, 219; 375/240.16; 324/307
See application file for complete search history.

(56) References Cited

U.S. PATENT DOCUMENTS 4,606,069 A * 8/1986 Johnsen ..................... 382/243
6,009,204 A   12/1999 Ahmad ...................... 382/236
6,097,837 A * 8/2000 Cok ........................... 382/167
6,320,378 B1 * 11/2001 Maier et al. ................ 324/307
2002/0044607 A1   4/2002 Koga et al. ............. 375/240.16

FOREIGN PATENT DOCUMENTS

JP    09-252448    9/1997

* cited by examiner

*Primary Examiner*—Anh Hong Do
(74) *Attorney, Agent, or Firm*—Larry Liberchuk (57) ABSTRACT

A method for compressing a sequence of digital images includes: comparing a reference image of the sequence of digital images to a subsequent image of the sequence of digital images. In response to the reference and subsequent images being the same within a predetermined threshold, 1) a count of a number of images discarded is incremented, 2) the subsequent image is discarded, and 3) the comparing step is repeated with a next subsequent image. In response to the reference and subsequent images not being within the predetermined threshold, 1) the count is initialized and 2) the comparing step is repeated using the subsequent image as the reference image. Rather than comparing whole images corresponding portions of the images can be compared and compressed independently.

20 Claims, 12 Drawing Sheets

SEQUENTIAL DIGITAL IMAGE COMPRESSION

BACKGROUND OF INVENTION

The invention relates to an apparatus and method for compressing a sequence of digital images. It finds particular application in conjunction with compressing the sequence of digital images, such as from a surveillance camera or other video stream in which all or a portion of the images remain relatively static and will be described with particular reference thereto. However, it is to be appreciated that the invention is also amenable to other applications.

As is well known in the prior art, a video image, when digitized, requires a large amount of storage. A plurality of video images (as used hereinafter: "a video scene"), such as a movie, requires hundreds of megabytes or even gigabytes of storage, if not compressed.

Various methods to compress a video scene are known in the prior art (e.g., MPEG1, MPEG2, etc). One prior art method is to derive a parameter by principal component analysis for all the images of the video scene. An image value based upon the parameter chosen by principal component analysis is determined for each of the video images. The resultant storage requirement, for one parameter, is one image full of component values for that parameter (N values for an image with N pixels) and one image value associated with each video image. If more than one parameter is derived for the video images, the total amount of storage required is multiplied correspondingly.

Surveillance cameras often run at a slow frame rate. At regular video rates, e.g., thirty images per second, a two hour video has over 200,000 video images and uses about 50 gigabyte of storage. The principal component analysis method, for one parameter, derives N parameter component values for each image.

Another method of compression of the prior art is to choose initial images as a reference frame. Subsequent images are compared to the reference frame, and only the differences or changes are stored. Thus, complete data is stored for each reference frame, but the changes are stored for subsequent images.

In such prior art method, the reference frames are chosen based upon every nth frame. Thus, the choice of the reference frame is not optimized.

U.S. Pat. No. 6,009,204 to Ahmad discloses a method of compressing a plurality of video images for storing, displaying and searching the plurality of video images. In the method, a video image, characterized by a plurality of pixels, is compressed by deriving at least one parameter based upon principal component analysis. An image value for each video image is then determined for the one parameter. The image value associated with each video image is compared to an image value associated with another video image to determine a difference. When the difference between image values of compared video images is below a threshold, one of them is discarded. The remaining video images are then stored. Using this method of compression, it becomes possible to search a video database to find a match between an inquiring video scene with a video database made up of a plurality of video scenes with each video scene having a plurality of video images.

Security cameras typically record incidents, e.g., a thief entering a shop, while non-relevant video images of the empty shop are discarded without being recorded. This reduces the storage requirement for image data at the loss of continuous recording.

As the use of video images to capture information becomes more prevalent and the continuous need for higher image quality leads to higher resolution and increased image parameters, it is increasingly advantageous to efficiently store and display a large plurality of video images, or the video scene with minimal storage space.

BRIEF SUMMARY OF INVENTION

In one aspect of the invention, a method of compressing a sequence of digital images is provided. At least a first portion of a reference image of the sequence of digital images is compared to at least a corresponding first portion of a subsequent image of the sequence of digital images. In response to the first portions of the reference and subsequent images being the same within a predetermined threshold, 1) a count of a number of first portions discarded is incremented, 2) the first portion of the subsequent image is discarded, and 3) the comparing step is repeated with at least a corresponding first portion of a next subsequent image. In response to the first portion of the reference and subsequent images not being within the predetermined threshold, 1) the count initialized and 2) the comparing step is repeated using the first portion of the subsequent image as the reference image.

In another aspect, a digital image processing system for compressing a sequence of digital images is provided. The digital image processing system includes a means for comparing at least a first portion of a reference image of the sequence of digital images to at least a corresponding first portion of a subsequent image of the sequence of digital images; b) in response to the first portions of the reference and subsequent images being the same within a predetermined threshold, a means for: 1) incrementing a count of a number of first portions discarded, 2) discarding the first portion of the subsequent image, and 3) repeating step a) with at least a corresponding first portion of a next subsequent image; and c) in response to the first portion of the reference and subsequent images not being within the predetermined threshold, a means for: 1) initializing the count and 2) repeating step a) using the first portion of the subsequent image as the reference image.

In another embodiment, the digital image processing system includes: a) a comparator for comparing at least a reference image portion of the sequence of digital images with corresponding subsequent image portions of the sequence of digital images; b) a counter which is incremented each time a subsequent image portion matches the reference image portion within a predetermined threshold, in response to a subsequent image portion not matching within the predetermined threshold, the non-matching subsequent response portion becoming the reference image portion and the counter being initialized; and c)a storage buffer which stores each reference and the count from the counter of a number of matching subsequent image portions following each reference image portion.

One advantage of the invention is that a sequence of digital images is compressed, particularly where content of the digital images is relatively static. For example, a sequence of digital video images from a surveillance camera or other video stream.

An additional advantage is the reduced storage requirements associated with storing the compressed sequence of digital images.

Another additional advantage is the reduced bandwidth requirements associated with communicating the compressed sequence of digital images.

Another additional advantage is that while playing back the compressed video stream, time information is preserved. In other words, the video stream looks "non-compressed" in time.

Other advantages will become apparent to those of ordinary skill in the art upon reading and understanding the following detailed description.

BRIEF DESCRIPTION OF DRAWINGS

The drawings are for purposes of illustrating exemplary embodiments of the invention and are not to be construed as limiting the invention to such embodiments. It is understood that the invention may take form in various components and arrangement of components and in various steps and arrangement of steps beyond those provided in the drawings and associated description. Within the drawings, like reference numerals denote like elements and similar reference numerals (e.g., 116, 216) denote similar elements.

DETAILED DESCRIPTION

Figure 1:
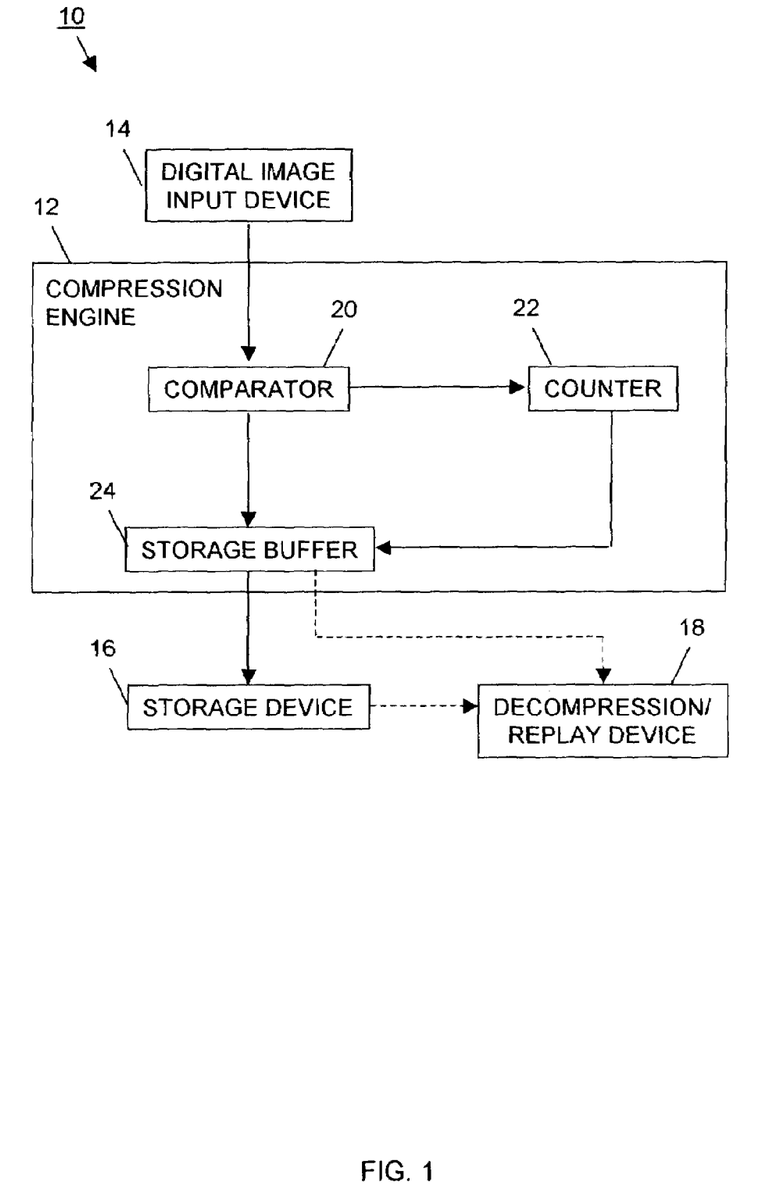
FIG. 1 is a block diagram of a digital image processing system with an embodiment of a compression engine for compressing a sequence of digital images.
Figure 2A:
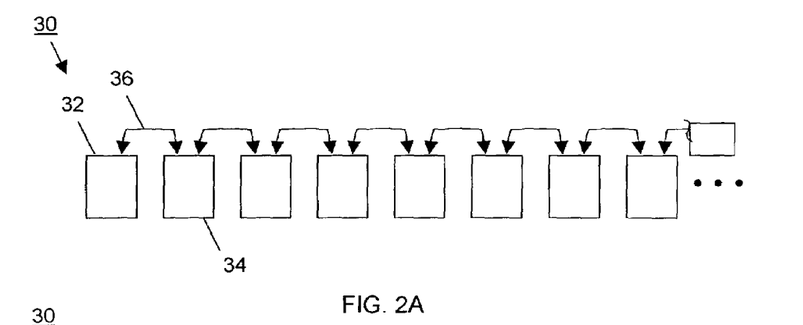
FIGS. 2A, B and C are diagrams of sequences of digital images showing several embodiments for comparing reference images to subsequent images.
Figure 2B:
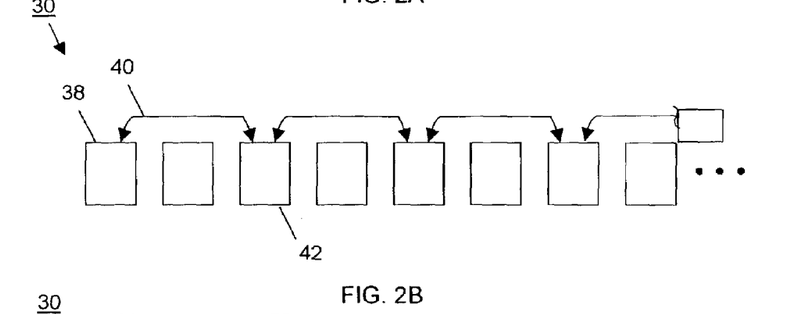
Figure 2C:
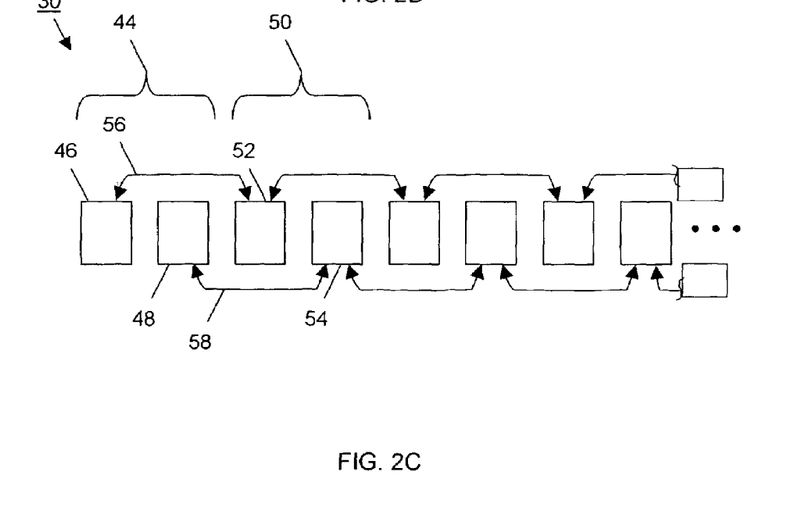

With reference to FIG. 1, a digital image processing system 10 includes a compression engine 12, a digital image input device 14, and a storage device 16. Preferably, the system 10 includes an analogous decompression/replay device 18 in place of or in addition to the storage device 16. Additionally, the compression engine 12 includes a comparator 20, a counter 22, and a storage buffer 24.

The digital image input device 14, for example, includes a digital video camera, a digital still camera, a digital video recorder, a video player with a digitized output signal, a digital image multiplexer, a digital video server, or any device capable of communicating a sequence of digital images.

With reference to FIGS. 1 and 2A–C, the comparator 20 receives the sequence of digital video images 30 from the digital image input device 14. In one embodiment (FIG. 2A), the comparator 20 identifies a first reference image 32 at the beginning of the sequence of images and compares subsequent images 34 to the first reference image. As shown, the comparator 20 compares the reference image 32 to the next 36 subsequent image. If the subsequent images are similar (i.e., within a predetermined threshold) to the reference, the subsequent images are discarded as the counter 22 counts the number of discarded images. When the comparator identifies a subsequent image that is different (i.e., outside the predetermined threshold) from the reference image, the number of times that the counter associated a subsequent image with the reference image and the reference image are stored in the storage buffer 24. The subsequent different image becomes a second reference image and subsequent images are now compared to the second reference image. This process continues until the last image in the sequence of digital video images 30 is encountered.

The storage buffer 24 stores one or more reference images interspersed with the values from the counter associated with each reference image. After a sequence of digital images 30 is processed, the one or more stored reference images and counter values are appended to form a compressed image file representing a compressed version of the sequence of digital images received from the digital image input device 14. When a given image compression process is complete, the storage buffer 24 transfers the compressed image file to the storage device 16. The storage device 16, for example, may include a digital video server, a hard disk drive, a memory storage area, a device with a portable magnetic or optical storage medium, or any device capable of storing the compressed image file.

From the storage device 16, the compressed image file is retrieved by a decompression/replay device 18. The decompression/replay device 18, for example, includes a decompression engine, a digital video player associated with a display or monitor, a digital video switch or router and one or more such digital video players, or any device capable of receiving a compressed image file, decompressing the file, and displaying the sequence of digital images 30. In one embodiment, the decompression engine includes a counter which causes each reference image to be displayed in accordance with the corresponding stored count. In this way the compressed video stream is event triggered (i.e., containing reference images that are not similar), while in replay the video is restructured according to its original time domain (i.e., making it look like real-time video).

In another embodiment, the decompression/replay device 18 retrieves each reference image and corresponding counter value directly from the storage buffer 24 during the compression process. In this embodiment, the decompression/replay device 18 is typically used to monitor the sequence of digital images 30 in real-time, subject to the inherent delays established by the equipment used and the compression process itself. Once compressed, each reference image is displayed for a time related to the associated counter value in the same manner as described above.

Since the compression process itself is sequential, when the first reference image display time expires, the second reference image and associated counter value should be available. This may lead to another embodiment in which a delay is established for releasing data from the storage buffer 24 to the decompression/replay device 18. This essentially establishes a reference image queue to ensure a continuous display is achieved on the decompression/replay device 18. Optionally, a maximum counter value, associated with the delay, is also established. This causes subsequent images that are similar to the reference image to be cut off at a certain predetermined point associated with the delay. The next digital image, even when it is similar to the previous reference image, becomes the next reference image and, otherwise, the compression process continues in the same manner as described above.

In another embodiment (FIG. 2B) of the digital image processing system 10, the comparator 20 identifies the first reference image 38 and skips a predetermined amount of images (e.g., one) 40 before comparing the subsequent images 42. This embodiment is described further in reference to FIGS. 5 and 6.

In still another embodiment (FIG. 2C) of the digital image processing system 10, the comparator 20 identifies the first sequence of reference images 44, having a predetermined amount of consecutive images (e.g., a first reference image 46 and a second reference image 48). Next the comparator 20 compares the first sequence of reference images 44 to subsequent sets of images 50 (e.g., a first subsequent image 52 and a second subsequent image 54). The first reference image 46 is compared 56 to the first subsequent image 52 and the second reference image 48 is compared 58 to the second subsequent image 54. This embodiment is described further in reference to FIGS. 9A and 9B.

Figure 3:
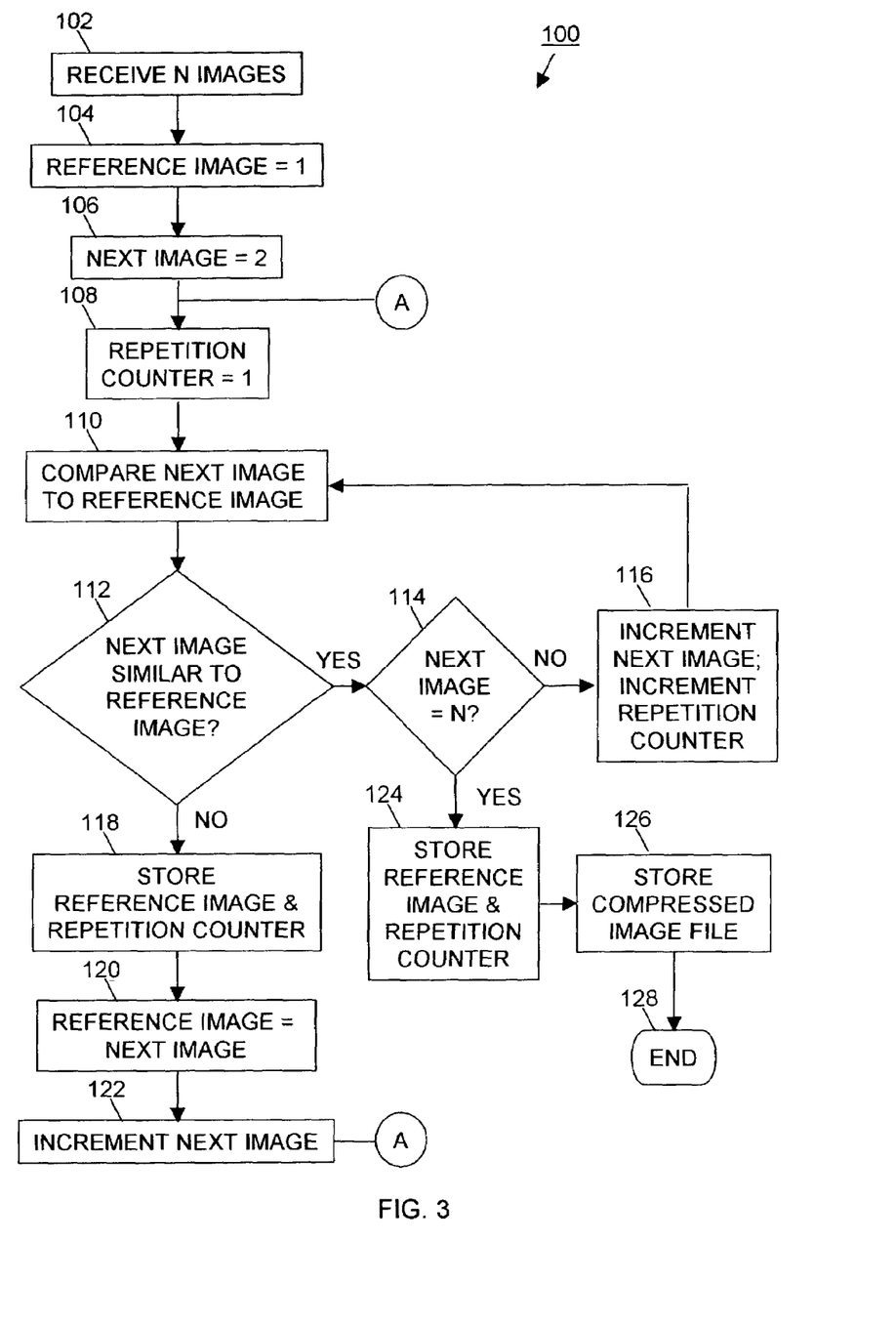
FIG. 3 is a flowchart of an embodiment of a method for compressing a sequence of digital images for storage by identifying images that are repeated within the overall sequence.

With reference to FIG. 3, a method 100 for compressing a sequence of digital images begins at a step 102 in which a plurality (N) of digital images are received. The plurality of digital images are arranged in a sequence in which the digital images may be numbered from 1 to N beginning with the first digital image. In a step 104, a reference image parameter is set to 1. Similarly, in a step 106 and a step 108, a next image parameter is set to 2 and a repetition counter parameter is set to 1, respectively. The reference image and next image parameters contain values that point to a like-numbered image in the 1 through N sequence of images. The repetition counter parameter contains a value associated with a quantity of times that a reference image is repeated in subsequent images of the overall sequence.

At a step 110, the next image is compared to the reference image. Then, a determination is made as to whether the next image is similar to the reference image in a step 112 based on a predetermined threshold. If the next image is similar to the reference image, a check is made to determine if the next image is equal to N (i.e., the next image is the last image in the overall sequence) in a step 114. If there are more images to process, in a step 116, the next image and repetition counter parameters are incremented by 1 and the process returns to the step 110 for another comparison. This loop continues comparing subsequent images to the reference image until the next image is not similar to the reference image or until the next image is the last image.

If the next image is not similar to the reference image in the step 112, a step 118 stores the digital image associated with the reference image parameter and the value in the repetition counter, for example, in a storage buffer. The reference image parameter is set to the current value in the next image parameter (step 120) and the next image parameter is incremented by 1 (step 122). Next, the process returns to the step 108 to reset the repetition counter parameter to 1 and begin the comparison loop for the new reference image.

If the next image is equal to N the in the step 114, a step 124 stores the digital image associated with the reference image parameter and the value in the repetition counter, for example, in the storage buffer. Next, in a step 126, the stored reference images and associated repetition counter values are appended and stored in a compressed image file, for example, in the storage buffer, on disc, on video tape, or the like. At this point, the method is at its end (step 128).

In an alternate embodiment, after the step 122, the method returns to the step 110 rather than the step 108. In this alternate embodiment, the repetition counter is not reset to 1. Hence, the repetition counter effectively becomes a digital image counter that tracks the number of the digital image being compared from 2 through N. Accordingly, the repetition counter values associated with reference images identify the last image associated with the reference image. Therefore, in order to identify the number of repetitions for a given reference image, a decompression/replay device subtracts the repetition counter value for the previous reference image plus 1 from the counter value for the given reference image. In this alternative embodiment, the reference image parameter value may also be saved along with the digital image and the repetition counter value. In this variation of the alternative embodiment, to identify the number of repetitions for a given reference image, a decompression/replay device subtracts the reference image parameter value from the repetition counter value.

Figure 4:
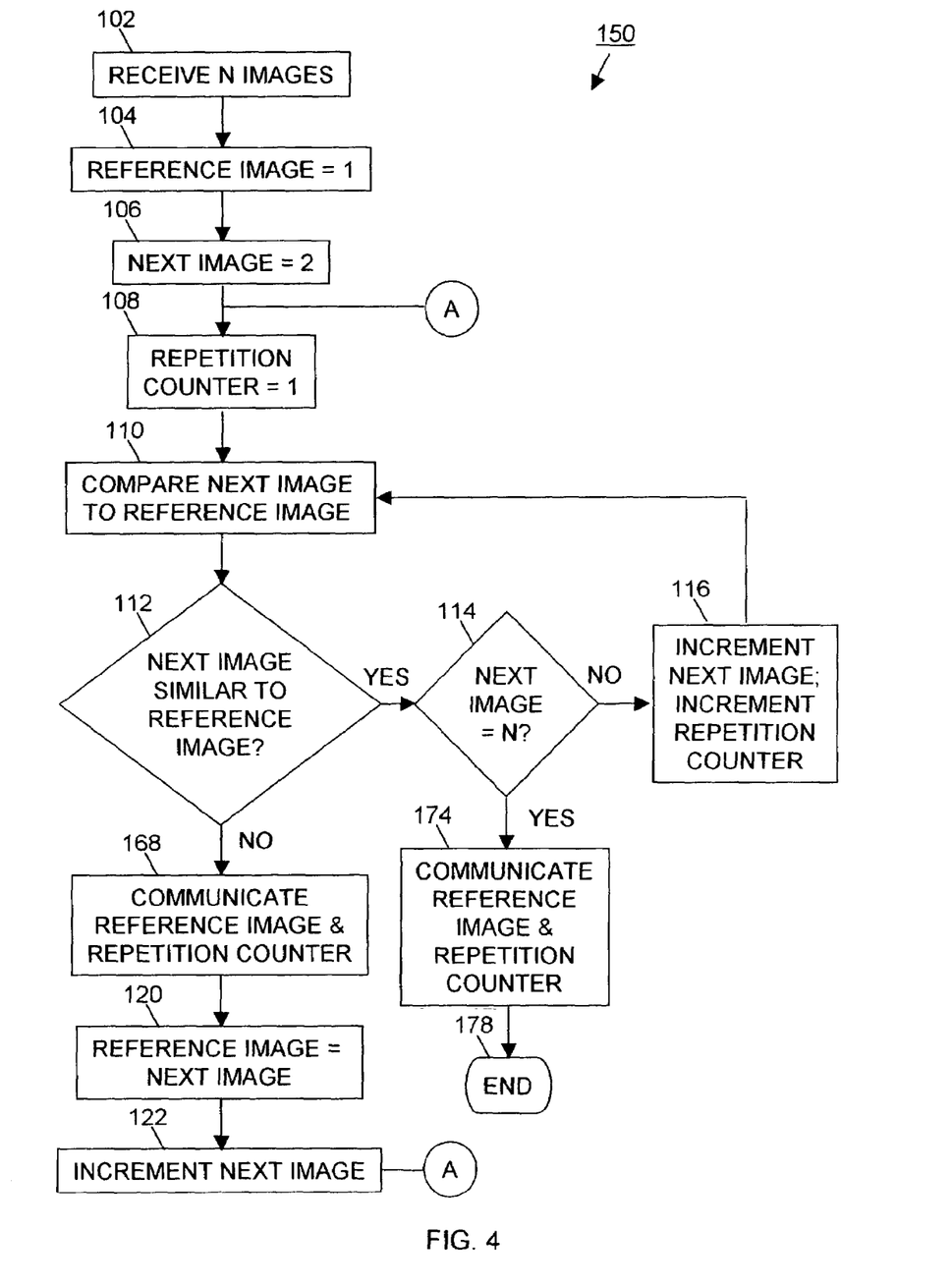
FIG. 4 is a flowchart of an embodiment of a method for compressing a sequence of digital images for communication by identifying images that are repeated within the overall sequence.

With reference to FIG. 4, a method 150 for compressing a sequence of digital images performs steps 102 through 116 in the same manner as described above for method 100 of FIG. 3. The basic difference in the embodiment being described is that the reference image and associated counter value are communicated to a device for monitoring instead of being stored.

More specifically, if the next image is not similar to the reference image in the step 112, the method continues to a step 168 where the digital image associated with the reference image parameter and the value in the repetition counter are communicated, for example, to a decompression/replay device. Next, the steps 120 and 122 are performed in the same manner as described above for method 100 of FIG. 3.

Additionally, if the next image is equal to N in the step 114, the method continues to a step 174 where the digital image associated with the reference image parameter and the value in the repetition counter are communicated, for example, to the decompression/replay device. At this point, the method is at its end (step 178).

Figure 5:
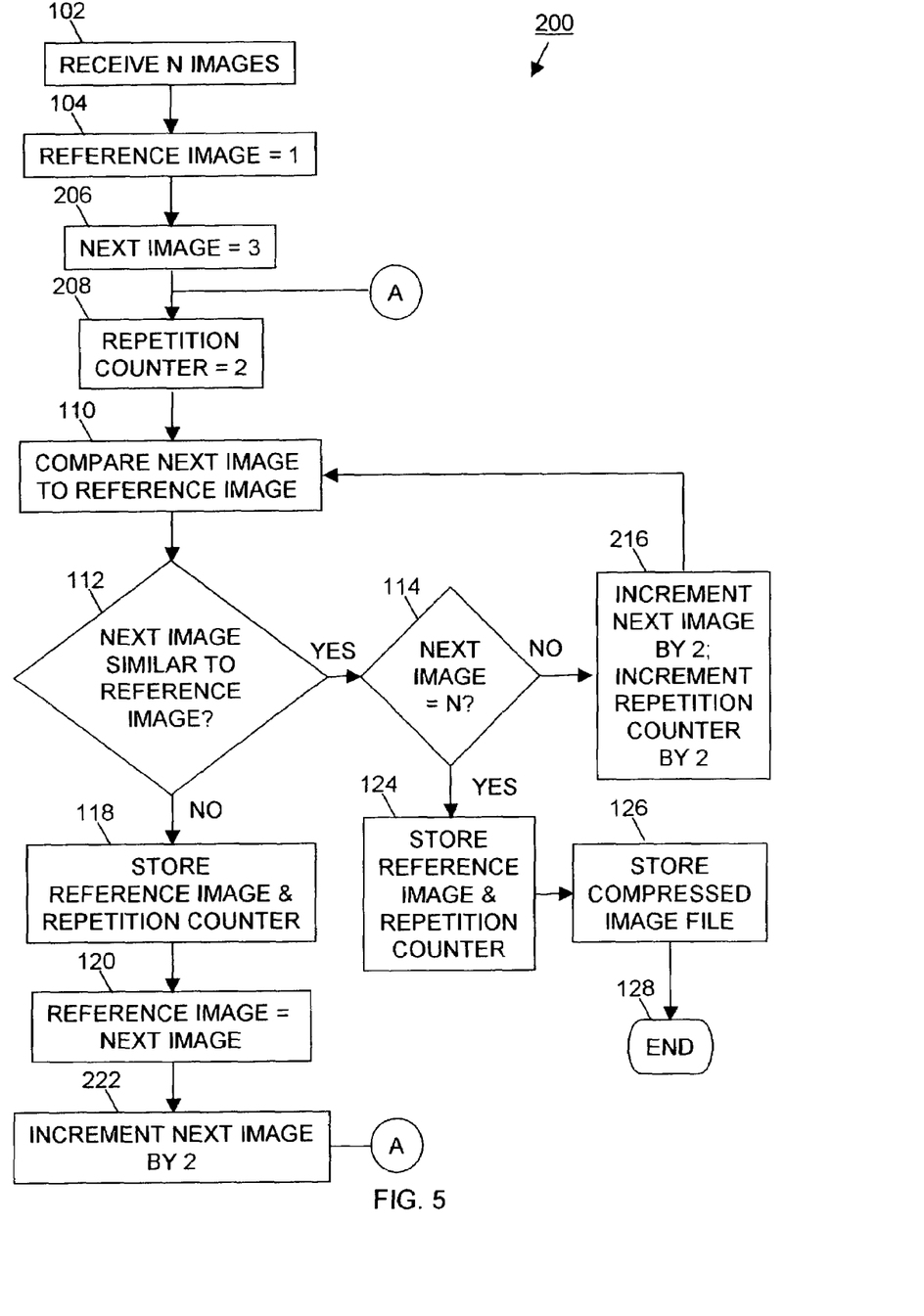
FIG. 5 is a flowchart of another embodiment of a method for compressing a sequence of digital images for storage by identifying images at a selected interval that are repeated within the overall sequence.

With reference to FIG. 5, another embodiment of a method 200 for compressing a sequence of digital images performs the steps 102 through 128 are generally in the same manner as described above for method 100 of FIG. 3. The basic difference in the embodiment being described is that the comparison loop of the method is incremented by two images instead of being incremented by one image.

In a step 206, the next image parameter is initially set to 3 rather than to 2. In a step 208, the repetition counter parameter is initially set to 2 rather than to 1. In a step 216, the next image and repetition counter parameters are incremented by 2 rather than by 1. Similarly, in a step 222, the next image parameter is incremented by 2 rather than by 1.

In an additional alternative embodiment, the comparison loop can by incremented by any number (I) rather than by 2. In this alternative embodiment, the repetition counter parameter is initially set to I rather than to 2 and the next image parameter is initially set to I+1 rather than to 3. Of course, when the next image and repetition counter parameters are incremented, they are incremented by I rather than by 2.

Figure 6:
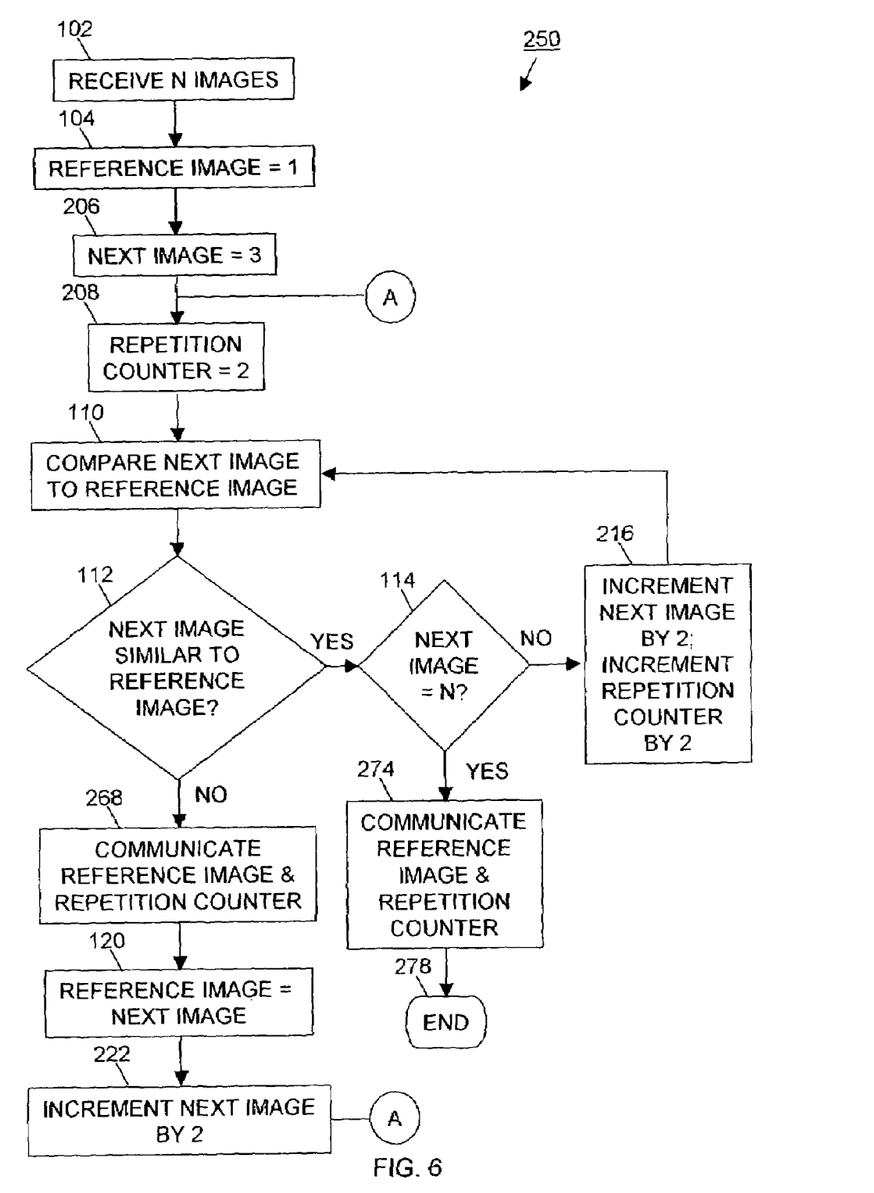
FIG. 6 is a flowchart of another embodiment of a method for compressing a sequence of digital images for communication by identifying images at a selected interval that are repeated within the overall sequence.

With reference to FIG. 6, another embodiment of a method 250 for compressing a sequence of digital images performs steps 102, 104, 110–114, and 120 are performed in the same manner as described above for method 100 of FIG. 3, and steps 206, 208, 216, and 222 are performed in the same manner as described above for method 200 of FIG. 5. The basic difference between method 200 of FIG. 5 and the embodiment being described is that the reference image and associated counter value are communicated to a device for monitoring instead of being stored, as in the embodiment of FIG. 4.

If the next image is not similar to the reference image in the step 112, the method continues to a step 268 where the digital image associated with the reference image parameter and the value in the repetition counter are communicated, for example, to a decompression/replay device.

Additionally, if the next image is equal to N in the step 114, the method continues to a step 274 where the digital image associated with the reference image parameter and the value in the repetition counter are communicated, for example, to the decompression/replay device. At this point, the method is at its end (step 278).

Figure 7:
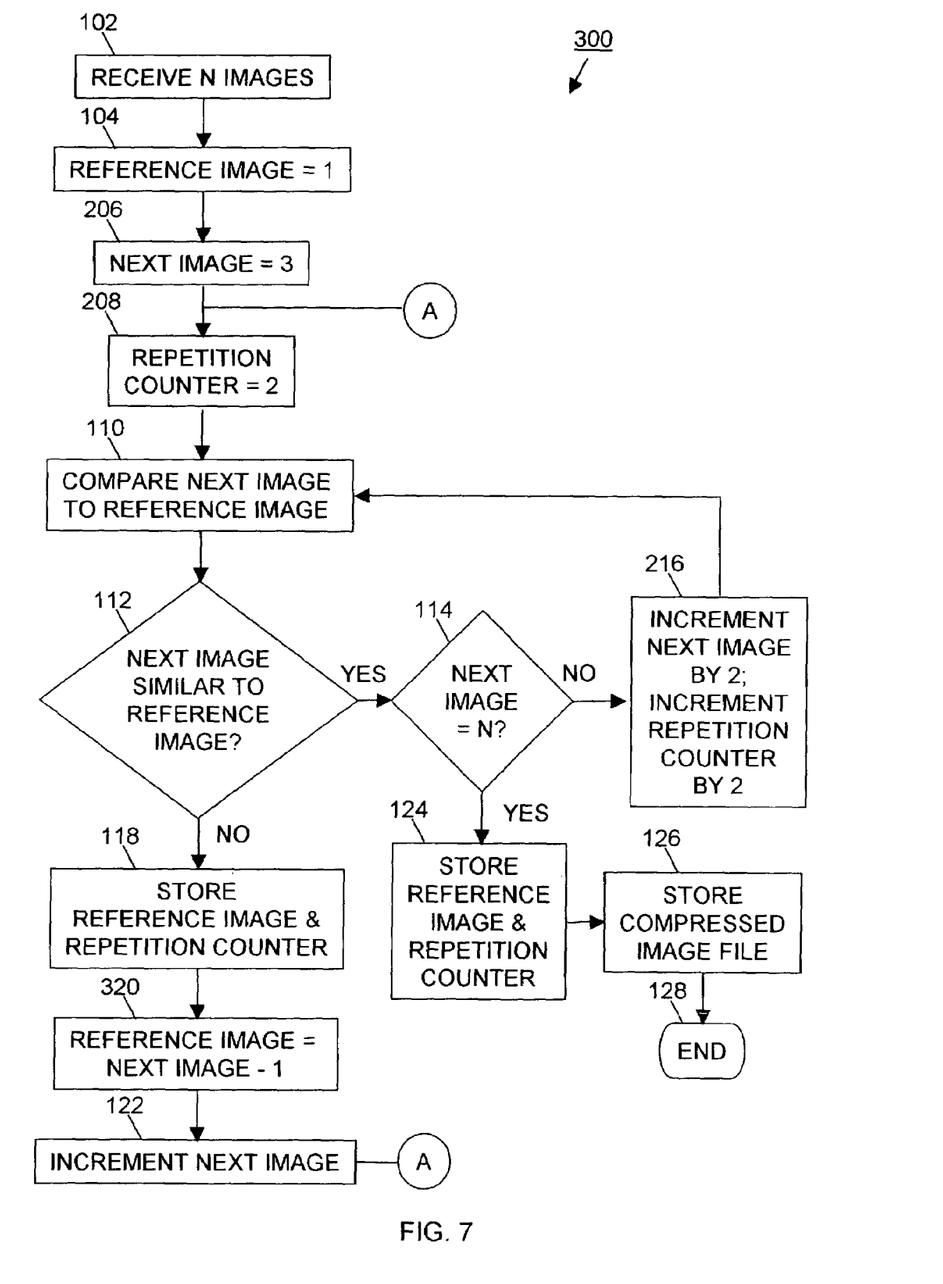
FIG. 7 is a flowchart of yet another embodiment of a method for compressing a sequence of digital images for storage by identifying images that are repeated within the overall sequence.

With reference to FIG. 7, yet another embodiment of a method 300 for compressing a sequence of digital images performs steps 102, 104, 110–114, 118, 122, and 124–128 in the same manner as described above for method 100 of FIG. 3, and performs steps 206, 208, and 216 in the same manner as described above for method 200 of FIG. 5. The basic difference between method 200 of FIG. 5 and the embodiment being described is that when a "next image" is not similar to a current reference image, the next reference image is set to an image between the current "next image" and the current reference image rather than being set to the current "next image." In other words, while the comparison loop skips an image by using an increment of 2, when the "next image" compared is not similar to the reference image, the next reference image becomes the last image that was skipped (i.e., the image prior to the current "next image").

The differences between method 200 of FIG. 5 and the embodiment being described are reflected in the steps 320 and 122. More specifically, after the digital image associated with the reference image parameter and the value in the repetition counter are stored in the step, the reference image parameter is set to the current value in the next image parameter minus 1 (step 320). Then, the next image parameter is incremented by 1 (step 122) and the process returns to the step 208.

For the alternative embodiment to method 200, where the comparison loop is incremented by any number (I): 1) step 320 is adapted to set the reference image parameter to the current value of the next image parameter minus I and plus A and 2) step 122 is adapted to increment the next image parameter by A. For this alternative embodiment, A is an integer value less than I. Typically A is 1 to avoid skipping images between "next images" that are not both similar to the reference image. However, any value for A will skip less images when selecting subsequent reference images than method 200 of FIG. 5.

Figure 8:
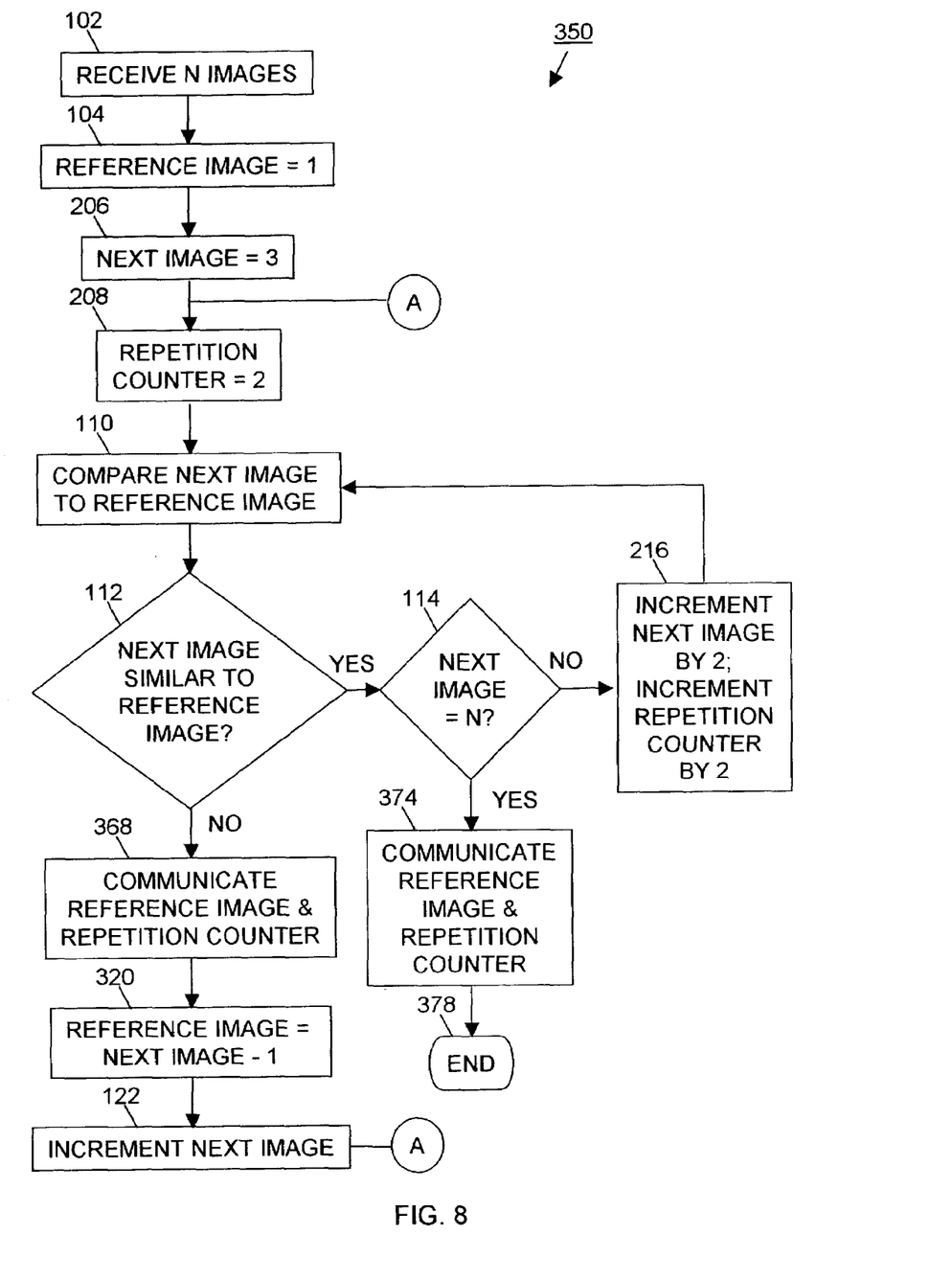
FIG. 8 is a flowchart of yet another embodiment of a method for compressing a sequence of digital images for communication by identifying images that are repeated within the overall sequence.

With reference to FIG. 8, yet another embodiment of a method 350 for compressing a sequence of digital images performs steps 102, 104, 110–114, and 122 in the same manner as described above for method 100 of FIG. 3, steps 206, 208, and 216 in the same manner as described above for method 200 of FIG. 5, and step 320 in the same manner as described above for method 300 of FIG. 7. The basic difference between method 300 of FIG. 6 and the embodiment being described is that the reference image and associated counter value are communicated to a device for monitoring instead of being stored.

If the next image is not similar to the reference image in the step 112, the method continues to a step 368 where the digital image associated with the reference image parameter and the value in the repetition counter are communicated, for example, to a decompression/replay device. Next, the step 320 is performed in the same manner as described above for method 300 of FIG. 7 and the step 122 is performed in the same manner as described above for method 100 of FIG. 3.

Additionally, if the next image is the last image, in the step 114, the method continues to a step 374 where the digital image associated with the reference image parameter and the value in the repetition counter are communicated, for example, to the decompression/replay device. At this point, the method is at its end (step 378).

Figure 9A:
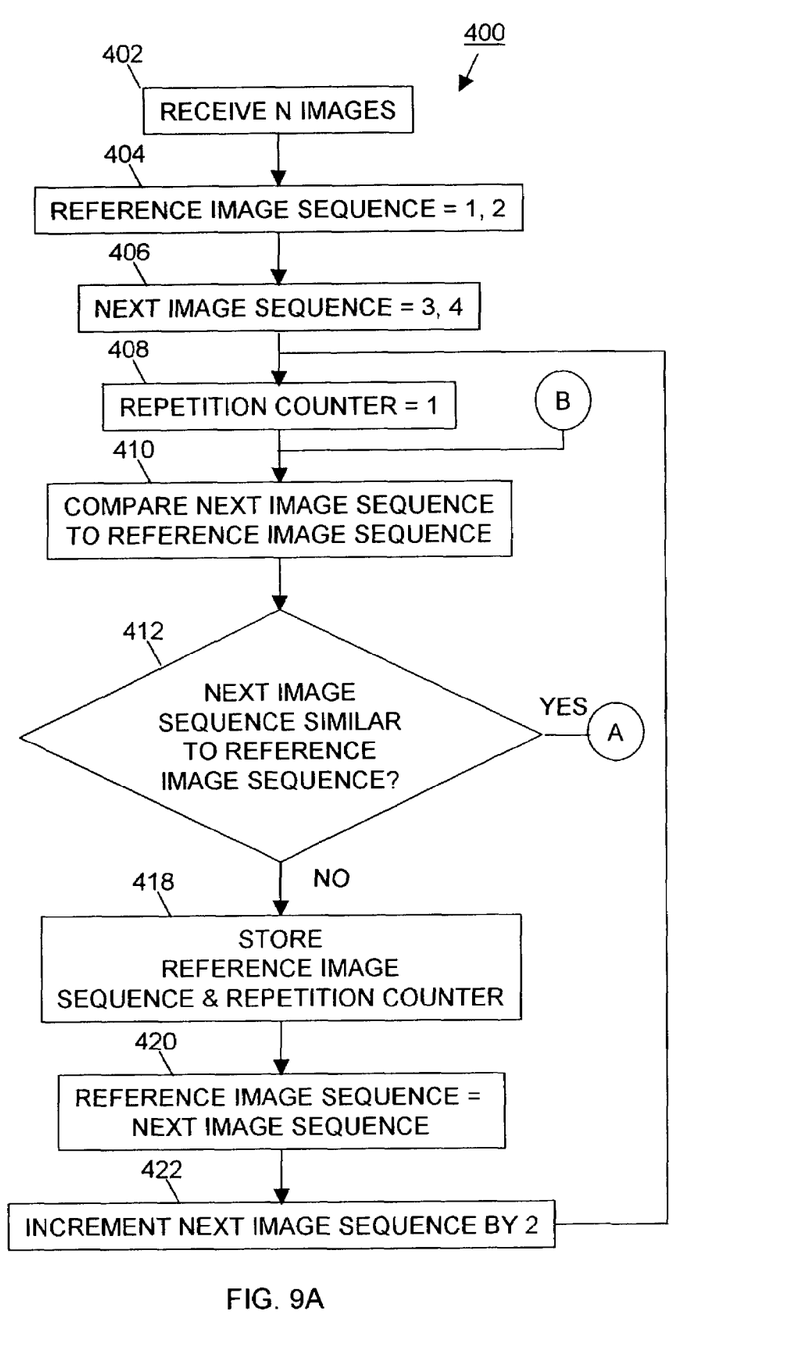
FIGS. 9A and 9B, taken together, are a flowchart of an embodiment of a method for compressing a sequence of digital images for storage by identifying sequences of images that are repeated within the overall sequence.
Figure 9B:
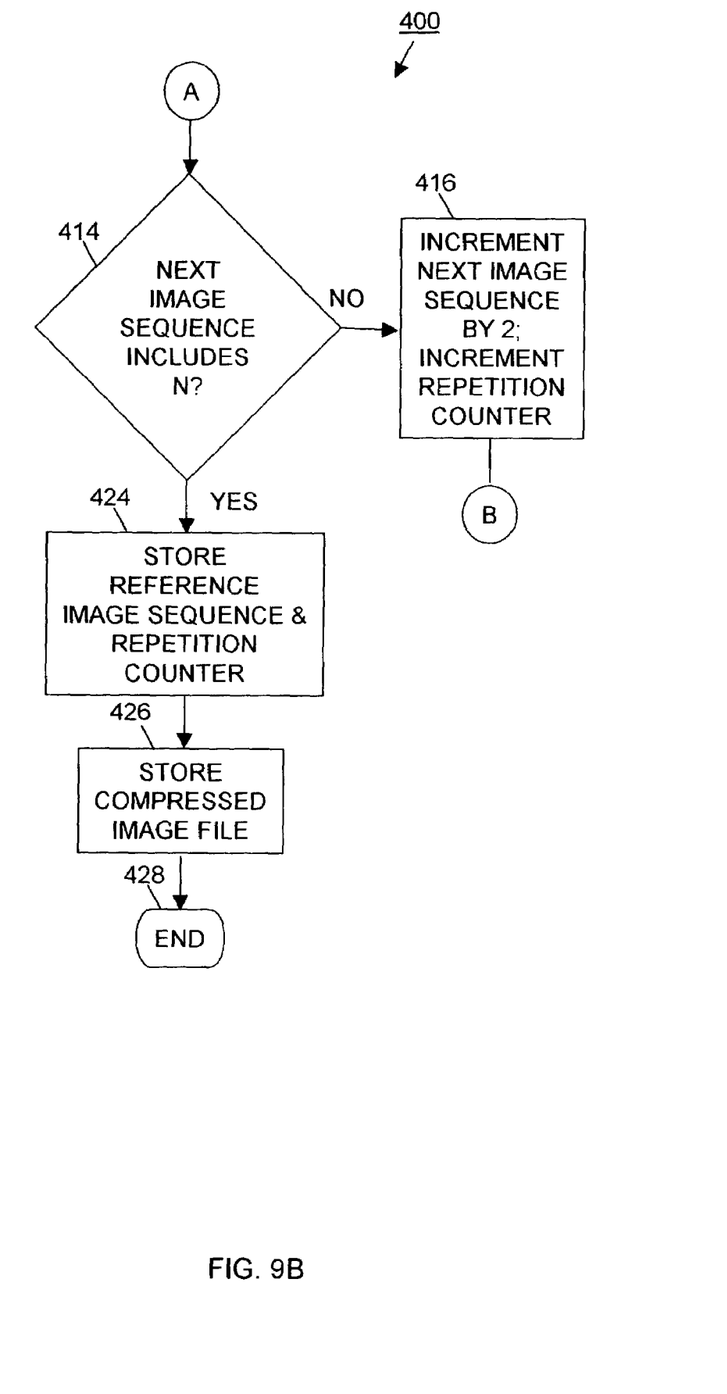

With reference to FIGS. 9A and 9B, a method 400 for compressing a sequence of digital images for storage a plurality (N) of digital images are received at a step 402. The plurality of digital images are arranged in sequence in which the digital images ordered starting at 1. In a step 404, reference image sequence parameters are set to 1 and 2. Similarly, in a step 406, next image sequence parameters are set to 3 and 4. In a step 408, a repetition counter parameter is set to 1. The reference image sequence and next image sequence parameters contain sets of values. Both sets contain the same quantity of values. The values in each set are sequential and the values for the next image sequence parameters follow in sequence with the values for the reference image sequence parameters. The values point to like-numbered images that are in the 1 through N sequence of images. The repetition counter parameter contains a value associated with a quantity of times that the reference image sequence is repeated in subsequent like-sized sequences of images in the overall sequence.

At step 410, the sequence of next images is compared to the sequence of reference images. Then, a determination is made as to whether the sequence of next images is similar to the sequence of reference images in a step 412. The determination is based on a predetermined threshold. If the sequence of next images is similar within the threshold to the sequence of reference images, a check is made to determine if the next image sequence parameters include N (i.e., the last image in the next image sequence is the last image in the overall sequence) in a step 414. If the next image sequence parameters do not include N, in a step 416, the next image sequence parameters are incremented by 2 and repetition counter parameter is incremented by 1 and the process returns to the step 410 for another comparison. This loop continues comparing subsequent sequences of images to the sequence of reference images until the sequence of next images is not similar to the sequence of reference images or until one of the next images is the last image.

If the sequence of next images is not similar to the sequence of reference images in the step 412, the method continues to a step 418 where the digital images associated with the reference image sequence parameter and the value in the repetition counter are stored, for example, in a storage buffer. The reference image sequence parameter are set to the current values in the next image sequence parameters (step 420) and the next image sequence parameters are incremented by 2 (step 422). Next, the process returns to the step 108 to reset the repetition counter parameter to 1 and begin the comparison loop for the new sequence of reference images.

If the next image sequence parameters include N in the step 414, the method continues to a step 424 where the digital images associated with the reference image sequence parameter and the value in the repetition counter are stored, for example, in a storage buffer. Next, in a step 426, the sequences of stored reference images and associated repetition counter values are appended and stored in a compressed image file, for example, in the storage buffer. At this point, the method is at its end (step 428).

In an alternate embodiment, there may be S reference image sequence parameters and S next image sequence parameters rather than just 2 parameters. The variable S is an integer value greater than 1. In this alternate embodiment, the image sequence parameters are incremented by S rather than by 2. In further adaptations, the value for S may be changed any time a new reference image sequence is selected.

Figure 10A:
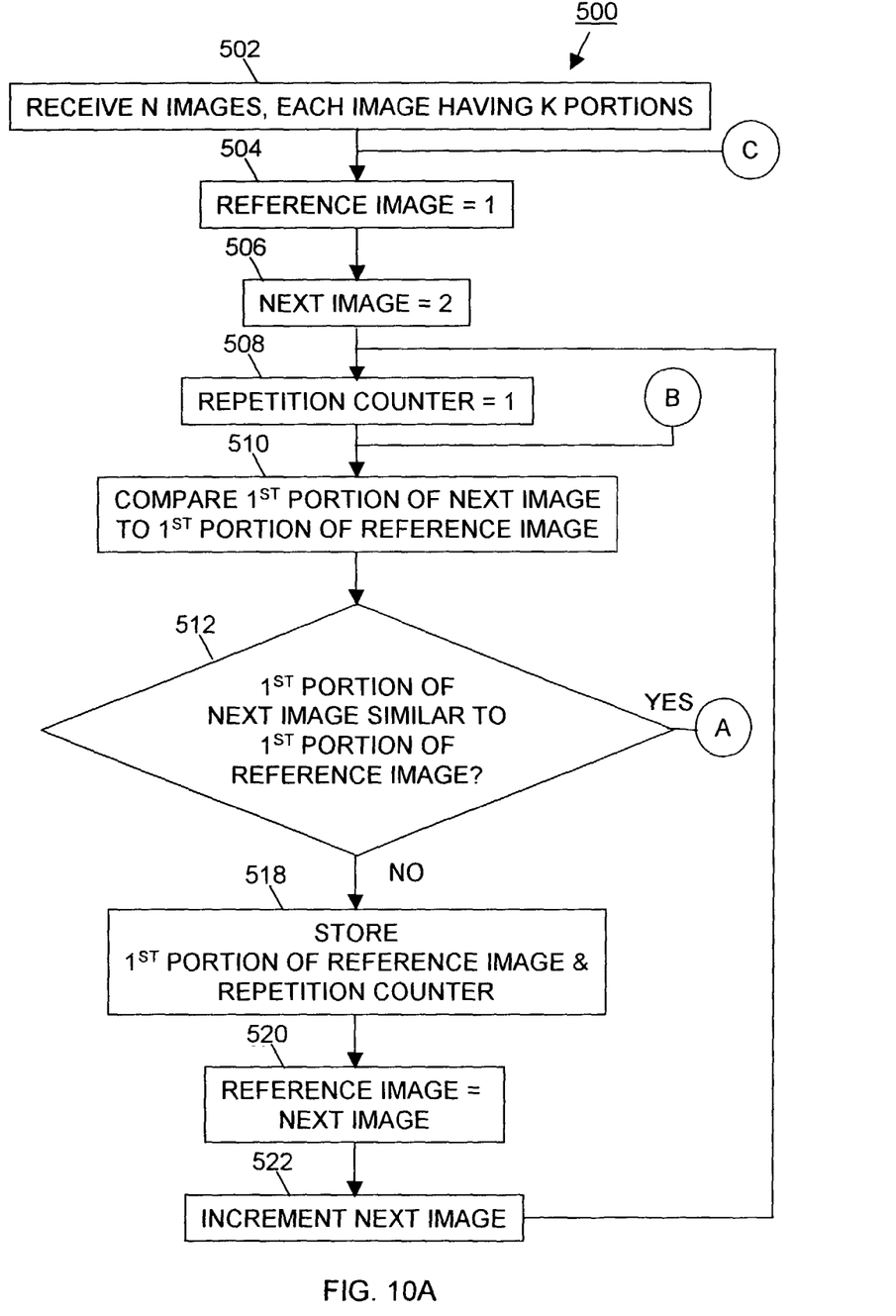
FIGS. 10A and 10B, taken together, are a flowchart of an embodiment of a method for compressing a sequence of digital images for storage by identifying portions of images that are repeated within the overall sequence.
Figure 10B:
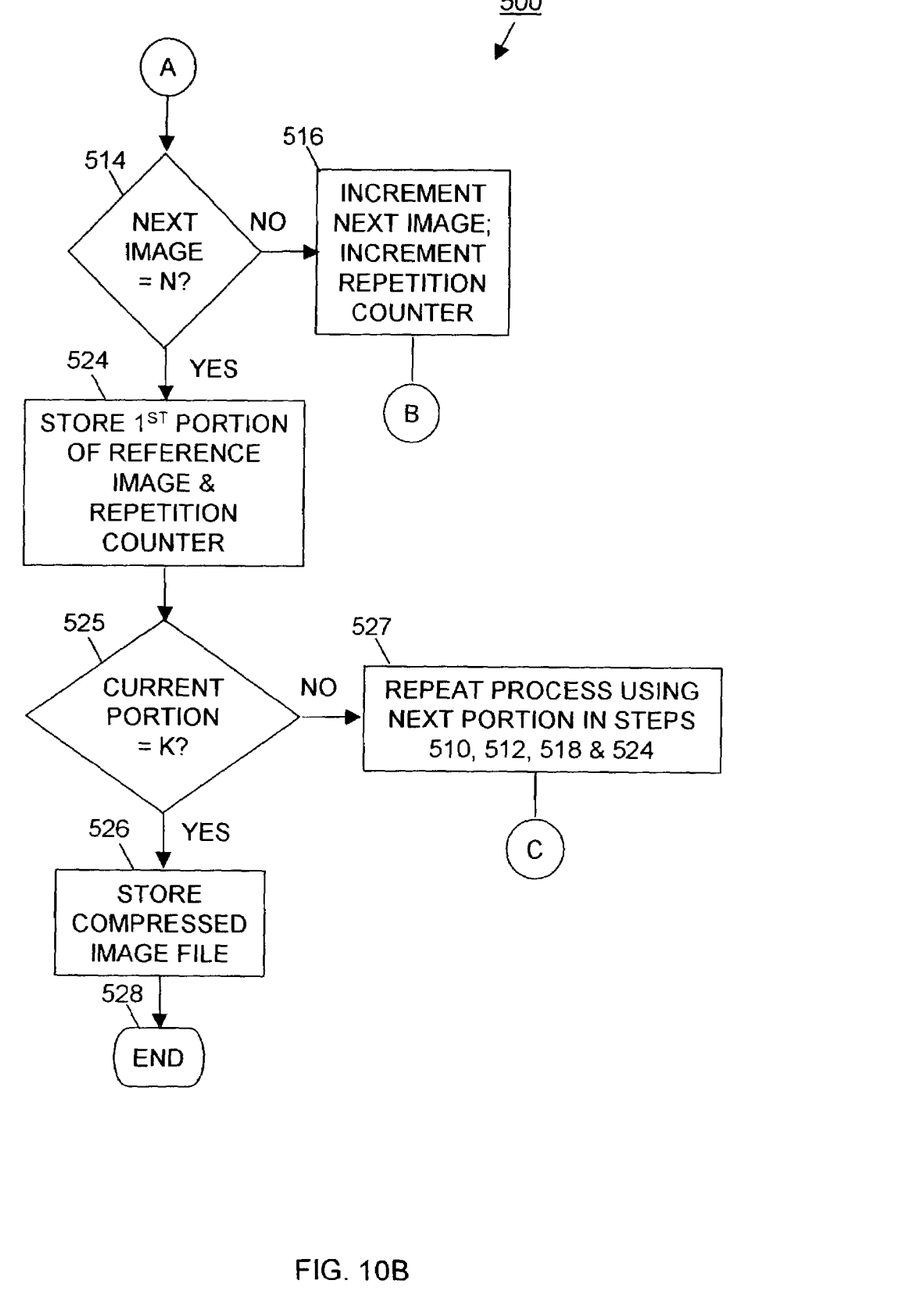

With reference to FIGS. 10A and 10B, a method 500 begins at a step 502 where a plurality (N) of digital images are received, each image having multiple (K) portions. The plurality of digital images are arranged in a certain sequence in which the digital images may be numbered from 1 to N beginning with the first digital image. Each digital image is divided into portions (e.g., halves, quarters, peripheral boarder/central field, etc.) in which regions that are less likely to change are segregated from regions that are more likely to change, e.g. sky along the top, grass along the bottom, the periphery around a performer at center stage, and the like. The regions can be dynamically changed. Based on the comparing steps, regions with more or less motion can be identified and the regions changed as the motion shifts within the frame. The image portion can be processed sequentially or concurrently.

In the sequential embodiment, in a step 504, reference image parameter is set to 1. Similar, in a step 506 and a step 508, a next image parameter is set to 2 and a repetition counter parameter is set to 1, respectively. The reference image and next image parameters contain values that point to a like-numbered image in the 1 through N sequence of images. The repetition counter parameter contains a value associated with a quantity of times that a portion of a reference image is repeated in subsequent images of the overall sequence.

At a step 510, a first portion of the next image is compared to a corresponding first portion of the reference image. Then, a determination is made as to whether the first portion of the next image is similar to the first portion of the reference image in a step 512. The determination is based on a predetermined threshold. If the first portion of the next image is similar to the reference image, a check is made to determine if the next image is equal to N (i.e., the next image is the last image in the overall sequence) in a step 514. If the next image is not the last image, in a step 516, the next image and repetition counter parameters are incremented by 1 and the process returns to the step 510 for another comparison. This loop continues comparing the first portions of subsequent images to the first portion of the reference image until the first portion of the next image is not similar to the first portion of the reference image or until the next image is the last image.

If the next image is not similar to the reference image in the step 512, the method continues to a step 518 where the first portion of the digital image associated with the reference image parameter and the value in the repetition counter are stored, for example, in a storage buffer. The reference image parameter is set to the current value in the next image parameter (step 520) and the next image parameter is incremented by 1 (step 522). Next, the process returns to the step 508 to reset the repetition counter parameter to 1 and begin the comparison loop for a first portion of the new reference image.

If the next image is equal to N in the step 514, the method continues to a step 524 where the first portion of the digital image associated with the reference image parameter and the value in the repetition counter are stored, for example, in the storage buffer. Next, in a step 525, a check is made to determine if the current portion being compared is equal to K (i.e., the current portion is the last portion to be compared). If the current portion is not equal to K, in a step 527, the process is repeated using a next portion of the image in the steps 510, 512, 518, and 524 by returning to the step 504. This loop continues advancing through each portion of the image after each nested comparison loop is completed until the current portion is the last portion to be compared.

If the current portion is equal to K in the step 526, the stored reference image portions and associated repetition counter values are appended and stored in a compressed image file (step 526), for example, in the storage buffer. At this point, the method is at its end (step 528).

In the concurrent embodiment, the method 500 operates on multiple portions of each image concurrently as if each image portion were a separate image. At least the steps 512 through 524 are performed in parallel for two or more of the K portions. After the step 524 is completed for each of the two or more K portions, step 525 performs as described above. In a minor adaptation to the embodiment being described, at least the steps 512 through 524 are performed in parallel for each of the K portions. In this adaptation, the steps 525 and 527 are not necessary and are removed from the process. It is to be appreciated that the various image portions select new reference frames independent of each other.

In another alternate embodiment, after step 522 the method may return to the step 510 rather than step 508. In this alternate embodiment, the repetition counter is not reset to 1. Hence, the repetition counter effectively becomes a digital image counter that tracks the number of the digital image being compared from 2 through N. Accordingly, the repetition counter values associated with reference images identify the last image associated with the reference image. Therefore, in order to identify the number of repetitions for a given reference image, a decompression/replay device subtracts the repetition counter value for the previous reference image plus 1 from the counter value for the given reference image. In this alternative embodiment, the reference image parameter value may also be saved along with the digital image and the repetition counter value. In this variation of the alternative embodiment, to identify the number of repetitions for a given reference image, a decompression/replay device subtracts the reference image parameter value from the repetition counter value.

In still another embodiment, the comparison loop can by incremented by any number (I) rather than by 1. In this alternative embodiment, the repetition counter parameter is initially set to I rather than to 1 and the next image parameter is initially set to I+1 rather than to 2. Of course, when the next image and repetition counter parameters are incremented, they are incremented by I rather than by 1. In an adaptation of this alternate embodiment, where the comparison loop is incremented by any number (I): 1) step 520 is adapted to set the reference image parameter to the current value of the next image parameter minus I and plus A and 2) step 522 is adapted to increment the next image parameter by A. For this alternative embodiment, A is an integer value less than I. Typically A is 1 to avoid skipping images between "next images" that are not both similar to the reference image. However, any value for A will skip less images when selecting subsequent reference images than merely using the I increment between "next images."

While the invention is described herein in conjunction with exemplary embodiments, it is evident that many alternatives, modifications, and variations will be apparent to those skilled in the art. Accordingly, the embodiments of the invention in the preceding description are intended to be illustrative, rather than limiting, of the spirit and scope of the invention. More specifically, it is intended that the invention embrace all alternatives, modifications, and variations of the exemplary embodiments described herein that fall within the spirit and scope of the appended claims or the equivalents thereof.

What is claimed is:

1. A method of compressing a sequence of digital images comprising:
   a) comparing at least a first portion of a reference image of the sequence of digital images to at least a corresponding first portion of a subsequent image of the sequence of digital images;
   b) in response to the first portions of the reference and subsequent images being the same within a predetermined threshold, 1) incrementing a count of a number of first portions discarded, 2) discarding the first portion of the subsequent image, and 3) repeating step a) with at least a corresponding first portion of a next subsequent image; and
   c) in response to the first portion of the reference and subsequent images not being within the predetermined threshold, 1) initializing the count and 2) repeating step a) using the first portion of the subsequent image as the reference image.

2. The method as set forth in claim 1 wherein the first portion is a fraction of each image.

3. The method as set forth in claim 2, further including performing steps a)–c) with at least a second portion of each image.

4. The method as set forth in claim 3, further including:
   performing steps a)–c) for the second portion of each image concurrently with steps a)–c) for the first portion of each image.

5. The method as set forth in claim 1 wherein each image has a single portion such that the first portion is a full image.

6. The method as set forth in claim 1, further including:
   storing at least the first portion of each reference image and the count of the number of first portions discarded.

7. The method as set forth in claim 6, further including:
   retrieving the stored first portions and the counts;
   displaying at least each first reference portion on a human viewable display;
   repeating the displaying of each first portion a number of times corresponding to the count of the number of first portions discarded between the displayed reference image and a next subsequent reference image.

8. The method as set forth in claim 1, further including:
   communicating at least the first portion of each reference image and the count of the number of first portions discarded.

9. The method as set forth in claim 8, further including:
   displaying at least each first reference portion on a human viewable display;
   repeating the displaying of each first portion a number of times corresponding to the count of the number of first portions discarded between the displayed reference image and a next subsequent reference image.

10. The method as set forth in claim 1 further including:
    in step a), concurrently comparing at least a portion of a second reference image with a corresponding portion of another subsequent image.

11. The method as set forth in claim 10, further including:
    storing at least the first portion of each reference image and the count of the number of first portions discarded.

12. The method as set forth in claim 11, further including:
    retrieving the stored first portions and the counts;
    displaying at least each first reference portion on a human viewable display;
    repeating the displaying of each first portion a number of times corresponding to the count of the number of first portions discarded between the displayed reference image and a next subsequent reference image.

13. The method as set forth in claim 1 wherein:
    in step a), the subsequent image is spaced I images from the reference image where I is an integer number;
    in step b), the count is incremented by I and the next subsequent image is spaced I from the current subsequent image; and
    in step c), the subsequent image used as the reference is spaced A images from the current reference image when repeating step a) where A is an integer number.

14. The method as set forth in claim 13 wherein the values for A and I are equal.

15. The method as set forth in claim 13 wherein the value for A is less than the value for I.

16. The method as set forth in claim 1 wherein the first portion is a 1/K fraction of each image where K is an integer number of portions per image.

17. The method as set forth in claim 16 further including performing steps a)–c) for each 1/K portion of each image.

18. The method as set forth in claim 17, further including:
    performing steps a)–c) for each 1/K portion of each image concurrently.

19. A digital image processing system for compressing a sequence of digital images, comprising:
    a) a means for comparing at least a first portion of a reference image of the sequence of digital images to at least a corresponding first portion of a subsequent image of the sequence of digital images;
    b) a counter means for counting discarded image portions;
    c) a means for:
       in response to the first portions of the reference and subsequent images being the same within a predetermined threshold, 1) incrementing the counter means, 2) discarding the first portion of the subsequent image, and 3) causing the comparing means to compare with at least a corresponding first portion of a next subsequent image to the reference image first portion; and
       in response to the first portion of the reference and subsequent images not being within the predetermined threshold, 1) initializing the counter means and 2) causing the comparing means to use the first portion of the subsequent image as the reference image in subsequent comparisons.

20. A digital image processing system for compressing a sequence of digital images, comprising:

a) a comparator which compares at least a reference image portion of the sequence of digital images with corresponding subsequent image portions of the sequence of digital images;

b) a counter which is incremented each time a subsequent image portion matches the reference image portion within a predetermined threshold, in response to a subsequent image portion not matching within the predetermined threshold, the non-matching subsequent response portion becoming the reference image portion and the counter being initialized; and c) a storage buffer which stores each reference and the count from the counter of a number of matching subsequent image portions following each reference image portion.

\* \* \* \* \*